H. Whiting.
Harvester Rake.
No. 58702.  Patented. Oct. 9. 1866.
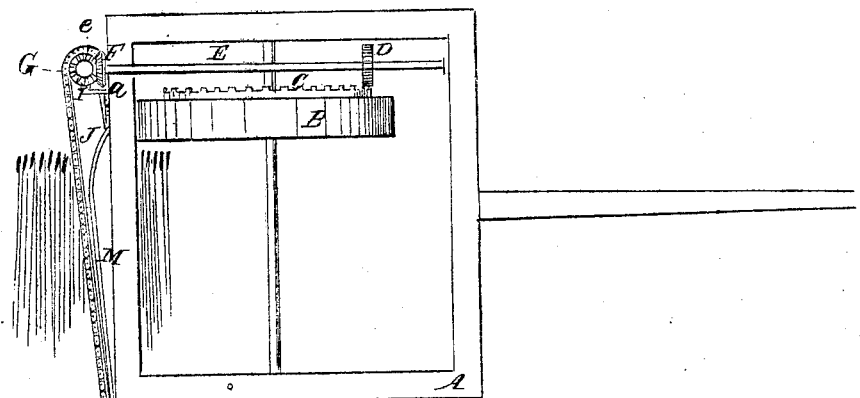
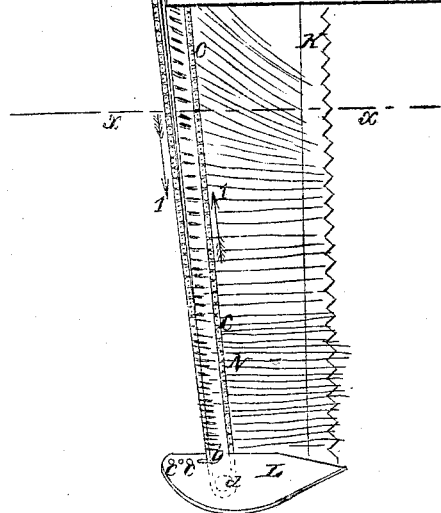
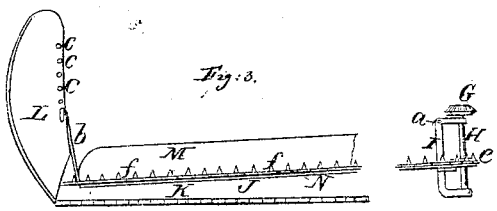
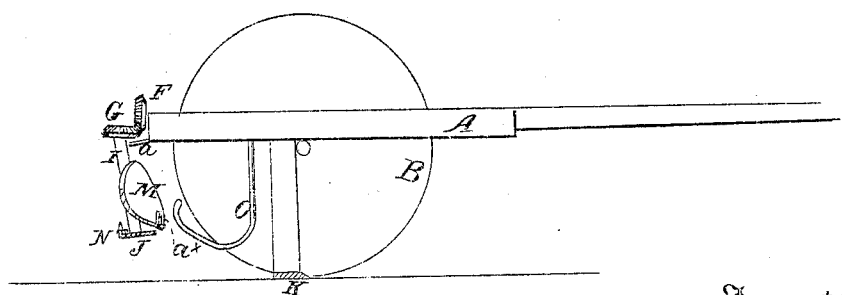

UNITED STATES PATENT OFFICE.

HORATIO WHITING, OF NEW YORK, N. Y.

IMPROVEMENT IN REAPING-MACHINES.

Specification forming part of Letters Patent No. 58,702, dated October 9, 1866.

*To all whom it may concern:*

Be it known that I, HORATIO WHITING, of the city, county, and State of New York, have invented a new and useful Improvement in Reapers; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a side sectional view of the same, taken in the line $x$ $x$, Fig. 1; Fig. 3, a front view of a portion of the same.

Similar letters of reference indicate corresponding parts.

This invention relates to a new and improved discharging device to be applied to reapers for the purpose of laying the cut grain in a continuous swath, so that it may be readily bound into sheaves and a rake dispensed with entirely.

A represents the main frame of a reaper, and B the driving-wheel thereof, with a concentric gear, C, attached to it, said gear meshing into a pinion, D, on a shaft, E, which is placed longitudinally on the main frame, and has a bevel-pinion, F, at its rear end, which gears into a corresponding pinion, G, on the upper end of a shaft, H, the latter being fitted in a frame, I, which is attached, by a pivot-rod, $a$, to the rear of the main frame A.

To the frame I there is attached a bar, J, which extends beyond the side of the main frame A a distance equal to the finger-bar K, the bar J being some distance behind the latter and rather more elevated than it, as shown clearly in Fig. 2. The outer end of this bar J is connected, by a hook, $b$, with the track-clearer L at the outer end of the finger-bar K, several holes $e$ $e$, being made in the track-clearer, to admit of the outer end of J being adjusted higher or lower, as may be desired.

The bar J has an inclined plate, M, attached to it, said plate projecting upward and backward from the front edge of J, and extending nearly its whole length.

N is an endless chain, which works around a pulley, $d$, at the outer end of the bar J, and around a pulley, $e$, on the shaft H in frame I. This chain N is provided with a series of vertical teeth, $f$, placed at suitable and equal distances apart, and the chain works around the plate M, as shown clearly in Fig. 1.

The operation will be readily seen. As the machine is drawn along the endless chain N will be moved in the direction indicated by the arrow 1, and the cut grain will fall back, so that the heads of the grain will fall upon the endless chain N and inclined plate M, the teeth $f$ catching into the grain and drawing it obliquely across the finger-bar to the rear of the main frame A, where it is discharged in a position parallel with the rear end of frame A, in consequence of the inner end of plate M being curved forward and the chain passing through an opening, $a^x$, in plate M.

A hook, O, is attached to the main frame A, to serve as a guide for the grain and insure it being discharged from the machine in the position specified.

Thus by this simple means I avoid the use of a rake, and lay the grain in a continuous swath convenient for binding.

I do not confine myself to a chain, N, for an endless belt might answer with teeth attached. The belt, however, would be an equivalent of the chain.

I claim as new and desire to secure by Letters Patent—

The adjustable toothed chain or belt N, in combination with the inclined plate M, arranged and operating substantially as described.

The above specification of my invention signed by me this 25th day of July, 1865.

HORATIO WHITING.

Witnesses:
M. M. LIVINGSTON,
C. L. TOPLIFF.